United States Patent
Stockton

[19]

[11] Patent Number: 6,069,405
[45] Date of Patent: May 30, 2000

[54] HIGH CAPACITANCE MIRROR DRIVER CELL

[75] Inventor: John F. Stockton, Austin, Tex.

[73] Assignee: Thomson Licensing S.A., Boulogne, France

[21] Appl. No.: 08/910,087

[22] Filed: Aug. 12, 1997

[51] Int. Cl.[7] .................................................. H01L 23/48
[52] U.S. Cl. ........................... 257/758; 257/433; 257/435
[58] Field of Search ............................. 359/59; 257/758, 257/750, 433, 435

[56] References Cited

U.S. PATENT DOCUMENTS

| 4,602,850 | 7/1986 | DeBenedetti | 350/333 |
| 5,365,355 | 11/1994 | Hastings, III et al. | 359/59 |
| 5,461,501 | 10/1995 | Sato et al. | 359/59 |
| 5,499,123 | 3/1996 | Mikoshioba | 359/59 |

FOREIGN PATENT DOCUMENTS 0 768 561 A2  4/1997  Japan ............................... G02F 1/136

*Primary Examiner*—Carl Whitehead, Jr.
*Assistant Examiner*—Roy Potter
*Attorney, Agent, or Firm*—Joseph S. Tripoli; Joseph J. Laks; Daniel E. Sragow

[57] ABSTRACT

A high capacitance mirror driver cell provides reduced photocurrent leakage and includes a metal 1 layer comprising integrated circuit elements and a metal 2 layer comprising additional integrated circuit elements, the metal 2 layer being positioned over and associated with send metal 1 layer. A metal 3 layer blocking light and forming a ground plane and a metal 4 mirror layer covering at least a portion of said dielectric material and said metal 3 layer for forming a capacitive element operating to substantially reduce the effects of photocurrent leakage.

6 Claims, 2 Drawing Sheets

HIGH CAPACITANCE MIRROR DRIVER CELL

TECHNICAL FIELD OF THE INVENTION

The present invention relates to liquid crystal display methods and systems that include reflective active pixel matrices and, more particularly, to a method, apparatus, and system for providing improved active matrix pixel circuits and, even more particularly, to a mirror driver cell, such as a dynamic or static memory cell, for reflective active matrix liquid crystal on silicon displays that provides improved light blocking, high light tolerance and provide high storage capacitance.

BACKGROUND OF THE INVENTION

Active matrix dynamic mirror driver cells are very sensitive to significant light flux. A problem with existing dynamic mirror driver cells relates to photocurrent-induced charge leakage. That is, with a mirror drive circuit, photo-electrons generated by ambient light cause rapid bleed-off of charges that are stored at driver transistor gates. Photocurrent leakage presents possible problems for both dynamic and static circuits. In dynamic circuits, display contrast ratio operation can suffer from photocurrent leakage at internal storage nodes. In static circuits, there is a tradeoff where it is possible to hold signal nodes at their proper voltages, but the light flux causes a significant increase in quiescent and operating current. Higher light flux yields greater current draws. Without adequate protection, this may ultimately cause the device to latch-up, potentially causing it to destruct.

The current practice in designing liquid crystal on silicon active matrix backplane drivers is to use commonly available three-layer metal integrated circuit fabrication processes. Devices created in this technology form light blocking structures from the metal 1 (M1) and metal 2 (M2) layers to keep stray photocurrents from adversely affecting the underlying integrated circuitry. The reflective mirror is formed on the metal 3 (M3) layer in these devices. This construction technique has the disadvantage of requiring that the metal 1 and metal 2 layers be quite wide in order to adequately attenuate light prior to reaching the active circuitry regions. In some designs, there is an additional N-well added to the circuit for the purpose of trapping photoelectrons. The result of these geometric restrictions is a mirror driver cell that is physically larger than otherwise necessary. The result of this light leakage is either a higher operating current in static-driver designs, or in a shorter hold-up time in dynamic driver designs. In the case of dynamic designs, the short hold-up times may further cause loss of the display's contrast between bright and dark pixels.

FIGS. 1A and 1B conceptually illustrate a top and side view, respectively, of a conventional mirror driver circuit for use in applications such as reflective active matrix liquid crystal on silicon displays. Referring to FIG. 1A, conventional mirror driver cell 10 includes a horizontal metal line M1 that provides horizontal light blocking, and a vertical metal line M2 to provide vertical light blocking. Covering metal layer M2 is reflective mirror metal layer M3.

FIG. 2 illustrates how a cone of light 12 including the various angles of light rays from 14 to 16 may penetrate through mirror gap opening 18 of conventional driver cell 10. The distribution of light in the cone is in a range and intensity distribution that is set by the external optical system. Taking the worst case, i.e., the light at the edge of the cone, it is possible to calculate how many bounces the light will take to become adequately attenuated so as to not interfere with mirror driver cell circuit operation. As FIG. 2 depicts, light rays 14, for example, enter at mirror gap 18 and reach metal layer M2 to bounce upward to metal layer M3. Using an anti-reflective metal for metal layer M2, may require that as many as 8 to 10bounces to reduce the photocurrent to the point that it does not affect the underlying circuitry below metal level M1. Furthermore, to reduce the effects of photocurrent leakage, the layout beneath metal layer 1 may include an N-Well 20 that serves as a photo-electron trap. N-well 20 can increase the amount of time the cell will adequately hold its charge. The problem with using additional N-well 20, however, is the space that N-well 20 consumes. Accordingly, to make multiple N-wells fit within the cell, without increasing the overall cell size, there is the need to be highly selective regarding the placement of the additional N-wells.

A circuit would be designed, therefore, including metal level M1 and M2 lines to be sufficiently wide to assure that 8 to 10 bounces occur at the worst case incident light angle. As this angle decreases to the angle of normal incidence, the number of bounces increases significantly. In order to increase the number of bounces for the desired degree of photocurrent reduction, the metal lines may need to be as large as 4 microns wide. This can, accordingly, significantly consume driver cell space for protection. This light blocking space requirement makes this design less than optimal.

SUMMARY OF THE INVENTION

There is a need for a method and system that eliminates or substantially reduces photocurrent leakage by providing a light blocking structure that is considerably improved relative to such structures in previous mirror driver cell designs.

There is a further need for a mirror driver cell that reduces or substantially eliminates photocurrent leakage, providing improved performance for both static and dynamic circuits.

A further need exists for a method and system to eliminate latch-up problems that occur in mirror driver cell circuits by light induced currents.

There is yet the need for an improved static mirror driver cell that requires less current for operation, due to less photocurrent-induced leakage.

According to one aspect of the present invention, there is provided a high capacitance mirror cell that provides reduced photocurrent leakage that includes a metal 1 layer for intra-cell connections of circuitry. A metal 2 layer includes additional interconnect, which is positioned over and in association with the metal 1 layer. A metal 3 layer blocks light to establish a light block and a ground plane, and a metal 4 mirror layer that covers most all of the dielectric material and the metal 3 layer. This configuration forms a light blocking capacitive element that substantially reduces photocurrent leakage within the mirror driver cell.

By creating a metal 4 layer mirror with an underlying metal 3 layer ground plane and providing a minimum sized opening for the connecting via from the underlying circuitry to the mirror, the present invention significantly reduces photocurrent leakage in the driver cell.

Optionally, the present invention may use a very thin dielectric material between the metal 3 and metal 4 layers to provide a high capacitance between the metal 4 layer mirror and the metal 3 layer ground plane. The use of anodized aluminum as this dielectric is the preferred approach. This has the additional benefit of further attenuating any light entering the mirror gap as the thinner dielectric layer causes the reflective light to bounce more times due to the smaller geometries involved.

A technical advantage of the present invention is that it eliminates or substantially reduces both the photocurrent leakage and its effects by providing an anti-reflective light blocking layer that is considerably larger than such layers in previous mirror cell designs. This advantage benefits both static and dynamic circuits. For static applications, the present invention provides an adequate light block to prevent photocurrent increased quiescent currents. For dynamic circuit operation, the present invention includes a high capacitance mirror element that increases cell hold-up time and also provides for significant photocurrent reduction, thereby reducing the amount of charge bleed-off in the underlying active circuitry.

Still another technical advantage of the present invention is that it eliminates latch-up problems that occur in other mirror driver cell circuits. This also eliminates the need for deep N-wells in every cell, which conventional dynamic mirror driver cells often require.

A further technical advantage of the present invention is that it eliminates the need for thick or deep mirror metal layers to limit the angle of permissible light reaching the embedded light blocking layers of the dynamic mirror driver cell.

Yet another technical advantage of the present invention is that because it requires less operating current due to less photocurrent induced leakage, there is a reduced need for the number and size of power and ground lines to achieve the same degree of circuit operation. Conventional designs require more power lines and more ground lines than are otherwise necessary, due to their use as light blocking layers. This allows the use of a power line for a pair of cells and a ground for a pair of cells. The present invention is more space efficient from a layout perspective. The result is a more efficient, cost effective mirror driver cell and, ultimately, improved reflective active matrix liquid crystal display operation.

The improved structure of the present invention makes use of technology permitting a fourth layer of metal and thereby uses a four-layer metal structure in which metal 3 layer serves as a light blocking plane and metal 4 layer serves as the mirror. Because the surface of the metal 3 layer can be anodized, and it is opaque to light, it yields a very significantly improved driver cell for dynamic logic.

In the present structure, light still enters a driver cell and bounces around. However, instead of traveling a few microns before it can affect the underlying circuitry, with the present invention light must travel a significant distance (e.g., 10 $\mu$m) during which it rapidly dissipates. In addition, with the present invention, the only point at which the light may reach an underlying circuit is a very small space around a centrally located via connecting between the metal 4 mirror layer to the underlying integrated circuit structure.

The present invention eliminates or substantially reduces photocurrents by providing an anti-reflective light block that is considerably better in geometry than those of known mirror driver cells. The known driver cells provide a metal blocking layer that is approximately 3½ microns wide with the effect of providing a light attenuation path that is about 3½ microns long. With the present invention, the attenuation path may be as much as 10 microns from edge to center. This additional attenuation length provides a significantly improved degree of photocurrent reduction.

The present invention also provides two important aspects, one relating to static circuits, the other relating to dynamic circuits. With the present invention, the material between metal 3 layer and metal 4 layer may be a conventional silicon dioxide insulating material. For dynamic circuits, the metal 3 layer may be formed of aluminum with an anodized insulating layer. The anodized layer may be as thin as 1/10th of a micron thick, for example. This creates a thin insulator on the order of 100 nanometers thick with two pieces of metal on opposing sides. The result is a very high value of capacitance per unit area.

The present invention solves the latch-up problem of conventional devices by reducing photocurrents. Substantially reducing photocurrents also eliminates the need for deep N-well electron traps in every cell. The need for using thick or deep metal layers for blocking also goes away.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein.

DETAILED DESCRIPTION OF THE INVENTION

Preferred embodiments of the present invention are illustrated in the FIGUREs wherein like numerals refer to like and corresponding parts of the various drawings.

Figure 1A:
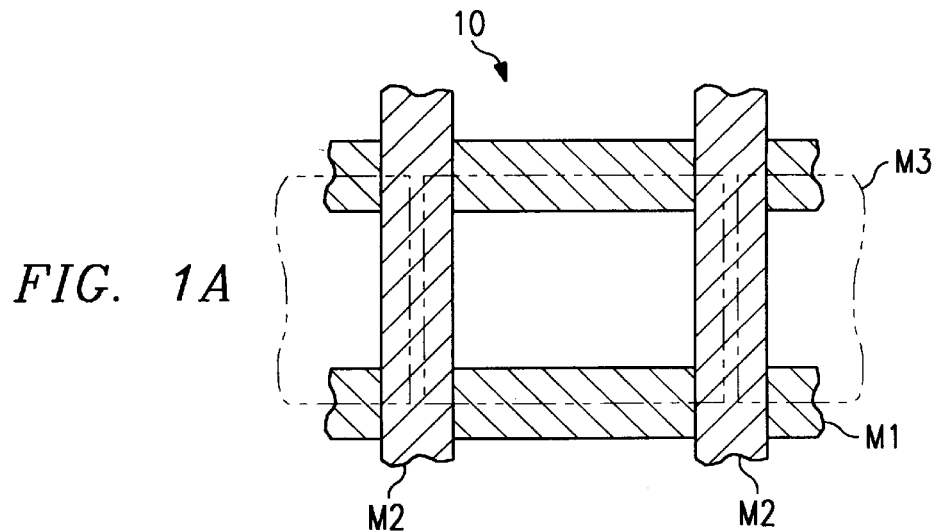
FIGS. 1A and 1B show conceptual top and cut-away side views, respectively, of a conventional mirror driver circuit.
Figure 1B:
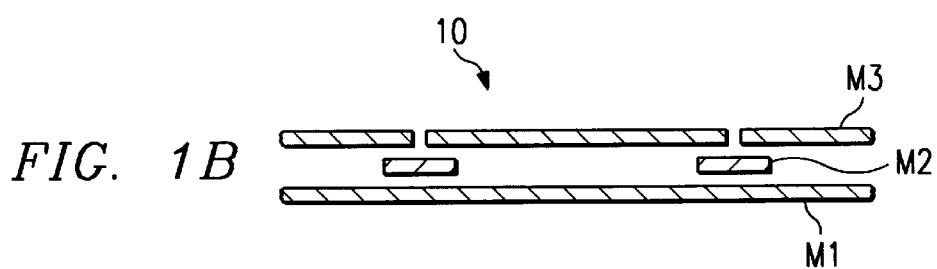
Figure 2:
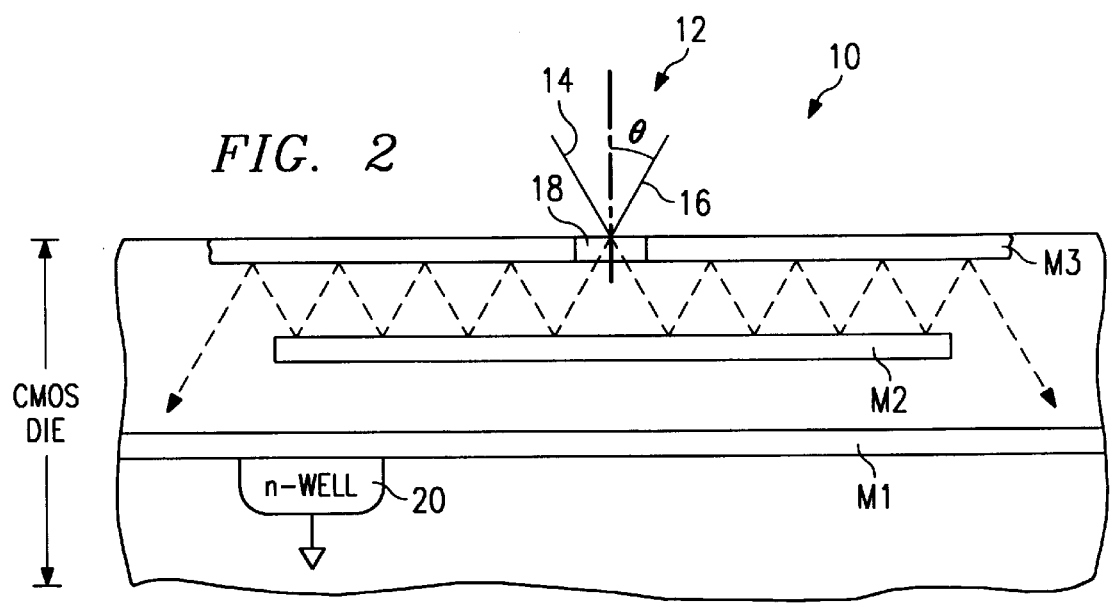
FIG. 2 depicts the mechanics of light protection performed in conventional mirror driver circuit.
Figure 3:
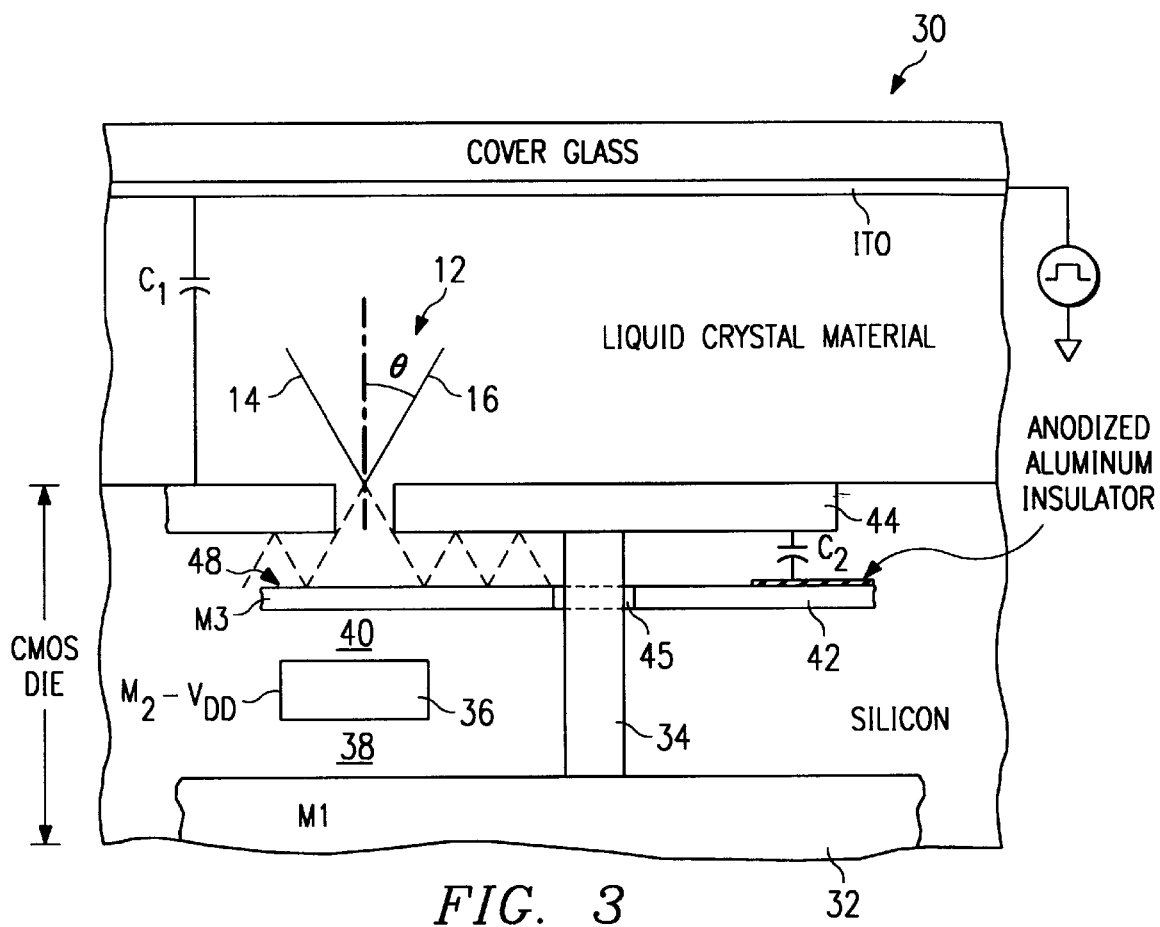
FIG. 3 provides a cut-away side conceptual view of a mirror driver circuit formed according to the teachings of the present invention.

FIG. 3 illustrates high capacitance mirror driver cell 30 of the present invention which may be formed in a CMOS die. High capacitance mirror driver cell 30 of the present invention may be formed in a conventional CMOS die using recently developed and implemented integrated circuit processing technologies providing for four metal levels in a CMOS die. In mirror driver cell 30, M1 metal layer 32, or optionally, M2 metal layer 36 attaches to via 34. Another M2 metal layer 36 may be patterned over M1 metal layer 32. Dielectric layer 38 separates M2 metal layer 36 from M1 metal layer 32. Dielectric layer 40 separates M2 metal layer 36 from M3 metal layer 42. Via 34 feeds through opening 45, which allows only minimal light passage, of M3 metal layer 42 to connect with M4 metal layer 44. Capacitor $C_2$ is representative of the capacitive element formed by placing a dielectric layer 46 between M3 metal layer 42 and M4 metal layer 44. Dielectric layer 46 may be formed as an anodized surface 48, on M3 metal layer 42.

In contrast to conventional devices where the mirror driver cell mirror layer is formed from the metal 3 layer, the mirror layer in the present invention is formed in the M4 metal layer 44. Light blocking in the known mirror driver cells uses a combination of a metal 2 layer and a metal layer 1. Light blocking with the present invention, in contrast, is performed at M3 metal layer 42. M3 metal layer 42 and M4 metal layer 44 may be devoted to photocurrent reduction, thereby forming a light bouncing path of as much as 10 $\mu$m or more for a typical mirror cell application. This completely frees M1 metal layer 32 layer and M2 metal layer 36 for integrated circuit elements and operations.

In fabrication, while the known mirror driver cells often require deep N-wells, the mirror driver cell 30 relies on the deposition of M4 metal layer 4, and preferably a thin dielectric between M3 metal layer 42 and M4 metal layer 44. M3 metal layer 42 and M4 metal layer 44 may each have individual thickness of approximately 0.1 µm, but a greater or lesser thickness may be desired for reasons other than reducing the light angle as in the conventional design. Dielectric layer 46 may be a standard silicon dioxide inter-level metal dielectric material.

Figure 4:
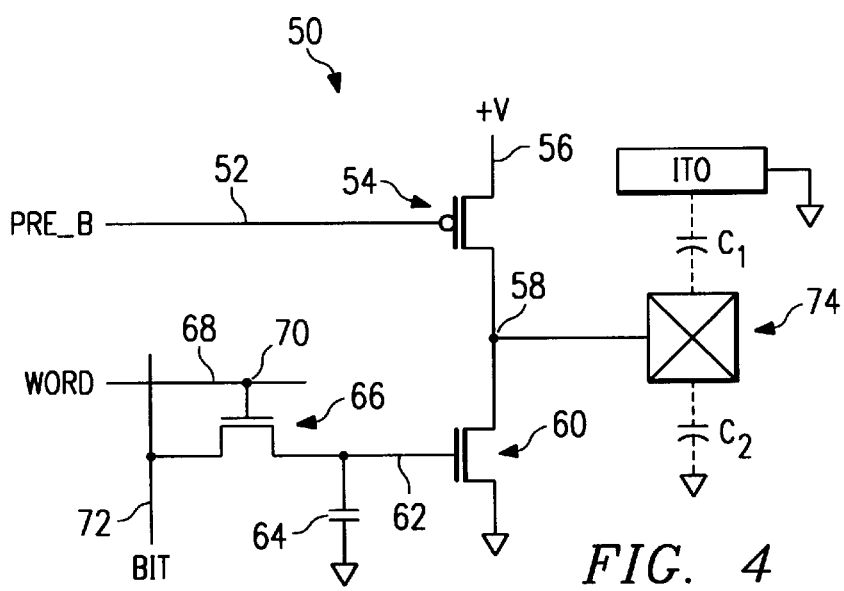
FIG. 4 provides an electrical equivalent circuit diagram of a dynamic mirror driver circuit using the teachings of the present invention.

FIG. 4 illustrates an electrical equivalent diagram 50 to illustrate operation of the present invention. In electrical equivalent diagram 50, PRE_B input 52 connects to the gate of FET 54. P-channel FET 54 connects to supply voltage 56 at its source and to node 58 and its drain. The source of N-channel FET 60 connects to node 58, while the FET 60 gate receives input at node 62. The FET 60 drain connects to ground. Capacitor 64 provides a charge storage node to ground from the FET 60 gate, which gate connects to the FET 66 drain. Wordline 68 connects to node 70 of FET 66. The FET 66 source receives input from bit line 72. Node 58 connects to pixel mirror 74 which forms capacitor C1 between metal mirror 74 and indium tin oxide (ITO) layer 76 which provides a transparent metal conductor layer and capacitor C2 is formed between metal mirror 74 and the metal 3 ground plane.

In FIG. 4, FET 66 serves as a pass gate that connects to bitline 72 that transfers data during a word access. This permits writing a horizontal scan line of pixels with each clock. The state of the bit line is copied onto the gate of FET 60. Capacitor 64 serves as a storage node and permits holding a charge the gate of FET 60. In the layout of the cell, a high capacitance value of C1 and C2 allows the mirror state to be held for a significant amount of time even if the charge held on capacitor 64 bleeds off. FET 66 turns on during word writes to charge capacitor 64, then FET 66 turns off. Consequently, capacitor 64 holds the charge. It is particularly important to protect capacitor 64 and FET 60 from light, because light reaching them bleeds off charge quickly.

During operation, P-channel FET 54 first turns on to precharge mirror 74 to a known state. FET 54 precharges mirror 74 up to a rail voltage 56, e.g., five volts. After precharge, the word signal 68 is driven high and data is written through FET 66 onto the FET 60 gate. If the mirror 74 is to be driven to a zero voltage, a voltage is applied to the gate of FET 60 that is at least a threshold voltage above ground, and FET 60 will then pull mirror 74 down to ground. If mirror 74 is to be driven to a high voltage, then a voltage is applied to the gate of FET 60 that is less than a threshold voltage above ground, and FET 60 remains off will not discharge the mirror 74 from its precharged state. In this state, node 62 is very sensitive to photocurrents generated by photoelectrons leaking into the gate of FET 60. For nominal amounts of photoelectrons leaking onto the gate of FET 60, the charge held in capacitors C1 and C2 is beneficial in that it prevents the voltage on the mirror node 58 from signifi-cantly changing due to this leakage. It is desired, therefore, to have the charge held in C1 and C2 to be fairly large, but not exceedingly large, so as to limit the performance of the device.

In summary, the present invention provides a metal struc-ture in which there is an underlying M3 metal ground plane layer 42. The present invention provides a minimum size opening for the via and then makes optimal use of the very thin, dielectric material between M3 metal layer 42 and M4 metal layer 44, using anodized aluminum dielectric coating 48 as the preferred approach. The present invention solves the light leakage problem with the benefit of increased amount of physical light blocking space and a more efficient layout than the previous attempts of using N-wells to trap leakage currents. The result is improved optical performance for a mirror driver cell.

Although the invention has been described in detail herein with reference to the illustrative embodiments, it is to be understood that this description is by way of example only and is not to be construed in a limiting sense. It is to be further understood, therefore, that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A mirror driver cell for providing reduced photocurrent leakage, comprising;

a top mirror first metal layer covering at least a portion of the underlying circuit structure;

a second metal layer, underlying said first metal mirror layer;

a first dielectric layer separating said first metal mirror layer from said second metal layer;

a third metal layer underlying said second metal layer;

a second dielectric layer separating said second metal layer from said third metal layer;

a fourth metal layer underlying said third metal layer; and a third dielectric layer separating said third metal layer from said fourth metal layer, forming a reflective mirror element operating to substantially reduce photocurrent leakage.

2. The driver cell of claim 1, in which said first dielectric layer comprises an anodized aluminum dielectric coating on said second metal layer.

3. The driver cell of claim 1, wherein said first metal layer, said first dielectric layer, and said second metal layer con-stitutes a light attenuating and blocking path.

4. The driver cell of claim 1, further comprising a via coupling said first metal layer to said fourth metal layer, said via positioned in association with said first metal layer to permit only minimal, if any, photon leakage to layers beneath said second metal layer.

5. A mirror driver cell for providing reduced photocurrent leakage comprising;

a top mirror first metal layer covering at least a portion of the underlying circuit structure;

a dielectric silicon dioxide layer separating said first metal layer from the next underlying metal layer; and a second metal layer, underlying said dielectric and said first metal mirror layers, forming a light blocking layer, forming a reflective mirror element operating to sub-stantially reduce photocurrent leakage.

6. A mirror driver cell for providing reduced photocurrent leakage, comprising;

a top mirror first metal layer covering at least a portion of the underlying circuit structure;

a dielectric material separating said first metal layer from the next underlying metal layer;

a second metal layer, underlying said dielectric and said first metal mirror layers, forming a light blocking layer forming a reflective mirror element operating to substantially reduce photocurrent leakage, said cell being constructed in a standard four metal layer integrated circuit process, where said first metal layer is formed in process layer Metal 4, said second metal layer is formed in process layer Metal 3 and said third metal layer is formed in process layer Metal 2.

* * * * *